US008836662B2

(12) United States Patent
Liu

(10) Patent No.: US 8,836,662 B2
(45) Date of Patent: Sep. 16, 2014

(54) METHOD AND DEVICE FOR KEY-PRESS JUDGMENT BASED ON TOUCH SCREEN

(75) Inventor: Tingchao Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 89 days.

(21) Appl. No.: 13/613,689

(22) Filed: Sep. 13, 2012

(65) Prior Publication Data

US 2013/0027336 A1    Jan. 31, 2013

Related U.S. Application Data

(63) Continuation of application No. PCT/CN2011/072167, filed on Mar. 25, 2011.

(30) Foreign Application Priority Data

Mar. 26, 2010    (CN) .......................... 2010 1 0133138

(51) Int. Cl.
G06F 3/041    (2006.01)
G06F 3/045    (2006.01)
G06F 3/042    (2006.01)
G06F 3/043    (2006.01)
G06F 3/048    (2013.01)
G06F 3/0488    (2013.01)

(52) U.S. Cl.
CPC .................................. *G06F 3/04886* (2013.01)
USPC ........... 345/173; 345/174; 345/175; 345/176; 345/177; 345/178; 715/773

(58) Field of Classification Search
CPC .. G06F 3/0488; G06F 3/04886; G06F 3/0426
USPC .................................... 345/173–178; 715/773
See application file for complete search history.

(56) References Cited

U.S. PATENT DOCUMENTS

| 2005/0093826 | A1 | 5/2005 | Huh | |
|---|---|---|---|---|
| 2006/0053387 | A1* | 3/2006 | Ording | 715/773 |
| 2007/0229476 | A1 | 10/2007 | Huh | |
| 2007/0257896 | A1 | 11/2007 | Huh | |
| 2009/0160761 | A1* | 6/2009 | Moosavi et al. | 345/156 |

FOREIGN PATENT DOCUMENTS

| CN | 101059735 A | 10/2007 |
|---|---|---|
| CN | 101566894 A | 10/2009 |
| CN | 101627351 A | 1/2010 |
| EP | 2112579 A1 | 10/2009 |
| JP | 2006133887 A | 5/2006 |

OTHER PUBLICATIONS

International Preliminary Report on Patentability (Chapter I of the Patent Cooperation Treaty) for PCT/CN201/1072167, (in Chinese with English Translation) issued Oct. 2, 2012; ISA/CN.

International Search Report for International Patent Application No. PCT/CN2011/072167, dated Jun. 9, 2011, and English translation thereof.

* cited by examiner

*Primary Examiner* — Dwayne Bost
*Assistant Examiner* — Christopher Kohlman
(74) *Attorney, Agent, or Firm* — Harness, Dickey & Pierce, P.L.C.

(57) ABSTRACT

A method and device for key-press judgment based on a touch screen are disclosed. The method involves: detecting a press operation; when the press operation is detected, acquiring position information of current pressed point and extended information corresponding to the position information, until the end of this press operation is detected; judging a pressed key corresponding to this press operation according to the position information and the extended information of pressed points in this operation.

10 Claims, 7 Drawing Sheets

METHOD AND DEVICE FOR KEY-PRESS JUDGMENT BASED ON TOUCH SCREEN

CROSS-REFERENCE TO RELATED APPLICATIONS

This application is a continuation of International Application No. PCT/CN2011/072167, filed on Mar. 25, 2011. This application claims the benefit and priority of Chinese Patent Application No. 201010133138.0, filed Mar. 26, 2010. The entire disclosures of each of the above applications are incorporated herein by reference.

FIELD

The present disclosure relates to internet technology and to a method and device for key-press judgment based on a touch screen.

BACKGROUND

This section provides background information related to the present disclosure which is not necessarily prior art.

With the development of electronic product technology and the demand for portable electronic products, such as handheld electronic products such as palm computer, PDA (personal digital assistant), mobile phones, tend to be smaller. Due to the miniaturization of the electronic products, the display screens are also smaller. Thus, more and more electronic products use touch screens to save space on the electronic products.

Touch screens can provide virtual keyboards for users, and the users can press the corresponding keys of the virtual keyboard for input. Generally, the user's actions in one click operation includes the following actions: pressing, moving and lifting up, or pressing and lifting up. When a terminal executes an action, the terminal determines functions need to be executed according to coordinates of a position clicked by the user. Since the area of each key is limited, when the user clicks, slight movement will cause a coordinate of a pressed point to be different from a coordinate of a lifting point, and the pressed point and the lifting point may belong to different key areas. At this time, the terminal cannot determine the key the user wants to input. The existing technology provides the following two approaches.

A first method is a touch screen scribing input method. An endpoint of the user's scribed line on a touch screen is used as a valid point to determine the input key. When the user cannot accurately click the key needed to be input due to various reasons, it scribes a line along a direction towards the input key until an endpoint of the scribed line enters into a valid range of the key needed to be input. The key can then be input correctly, thereby avoiding the troubles of having to lifting the pen and reentering after deleting the wrong input during an error click. This greatly reduces the possibility of wrong input and effectively improves the input speed.

A second method adjusts the size of the key area according to use frequency. Effective areas of the keys are dynamically adjusted according to the high-frequency and low frequency information of using numbers of the keys. When the effective areas of the keys with high-frequency are amplified, it is defaulted in the controversial area that the keys with high-frequency using numbers are effective. When the screen key is touched for input, it can determine whether the input of the touch screen key is an effective input, and improve the input efficiency of the touch screen keys.

There are at least two disadvantages in the existing technology.

For the scribing input method, it uses the endpoint of the user's scribed line on a touch screen as the only judgment condition to determine keys, and judges the user's behavior only through coordinates of the lifting point. This may cause misjudgment of the user's behavior due to movement of the touchpen when the touchpen is lifted up. Regarding adjusting size of the key area according to use frequency, since the key areas are adjusted according to the frequencies, this will affect the accuracy of user's clicking on uncommonly used keys, if a plurality of keys with similar frequencies are arranged together, this will make the method of this solution invalid.

SUMMARY

This section provides a general summary of the disclosure, and is not a comprehensive disclosure of its full scope or all of its features.

Various embodiments provide a method and device for key-press judgment based on touch screen, which can improve the accuracy of the key-press judgment of the touch screen.

One method for key-press judgment based on touch screen provided in one embodiment of the present invention includes:

detecting a press operation;

when the pressing operation is detected, acquiring position information of current pressed point and extended information corresponding to the position information, until an end of the press operation is detected; and judging a pressed key corresponding to the press operation according to the position information and the extended information of the pressed point in the press operation.

The method further includes when it is judged that the press operation corresponds to an effective pressed key, inputting according to the pressed key corresponding to the press operation.

The extended information includes at least one of:

a judgment area of a pressed key corresponding to the position information; and time information of the pressed point when pressing the pressed point to generate the position information.

When the extended information is the judgment area of the pressed key, the judging a pressed key corresponding to the press operation according to the position information and the extended information of the pressed point in the press operation includes:

acquiring a position information of a first pressed point in the press operation;

judging a pressed key corresponding to the first pressed point according to a display area which the position information of the first pressed point belongs to;

acquiring a display area of the pressed key corresponding to the first pressed point, and dynamically acquiring a judgment area of the pressed key corresponding to the first pressed point according to the display area;

acquiring a position information of a second pressed point;

if the position information of the second pressed point is in the judgment area, then it is judged that a pressed key corresponding to the second pressed point is the same as the pressed key corresponding to the first pressed point; otherwise, judging the pressed key corresponding to the second pressed point according to a display area where the position information of the second pressed point belongs to; cycling in this way, until all pressed points in the press operation have been judged; and judging a corresponding pressed key determined according to position information of the last pressed point as the pressed key corresponding to the press operation.

The acquiring a judgment area of the pressed key according to the display area of the pressed key includes amplifying the display area of the pressed key to obtain the judgment area of the pressed key.

When the time information is the time information of the pressed point, the judging a pressed key corresponding to the press operation according to the position information and the extended information of the pressed point in the press operation includes:

respectively judging a pressed key and pressing time corresponding to each pressed point according to position information and corresponding time information of each of a plurality of pressed points generated in the operation;

for each corresponding pressed key, acquiring a number of pressed points corresponding to the pressed key according to corresponding position information, and acquiring a duration time of a pressing corresponding to the pressed key according to a press time of the corresponding last pressed point and a press time of the corresponding first pressed point in time sequence; and judging the pressed key corresponding to the pressed operation in accordance with preset rules according to the acquired number of pressed points and duration time for each pressed key.

When the acquired multiple pressed points correspond to the same pressed key, the judging the pressed key corresponding to the pressed operation in accordance with preset rules according to the acquired number of pressed points and duration time for each pressed key is: the corresponding same pressed key is the pressed key corresponding to the press operation.

When the acquired multiple pressed points correspond to different pressed keys, the judging the pressed key corresponding to the pressed operation in accordance with preset rules according to the acquired number of pressed points and duration time for each pressed key is:

when a number of pressed points corresponding to the last pressed key reaches a point threshold and/or a duration time corresponding to the last pressed key reaches a time threshold, determining that the pressed key corresponding to the press operation is the last pressed key; and otherwise, judging according to a number of pressed points corresponding to the second last pressed key and a duration time of the pressed points; which is: when the number of pressed points corresponding to the second last pressed key does not reach a point threshold and the duration time corresponding to the second last pressed key does not reach a time threshold, then it is determined that the pressed key corresponding to the press operation is the corresponding last pressed key, otherwise, it is determined that the pressed key corresponding to the press operation is the corresponding second last pressed key.

The method further includes according to the corresponding pressed key determined according to the pressed point, displaying a prompting message of the pressed key to the user.

When the extended information is judgment area and time information of the pressed key, the judging a pressed key corresponding to the press operation according to the position information and the extended information of the pressed point in the press operation includes:

judging a pressed key corresponding to each pressed point according to the position information of the pressed points in the press operation and the judgment area of corresponding pressed key;

judging a pressing time corresponding to each pressed point according to the position information and corresponding time information of the pressed points in the press operation;

acquiring a number of pressed points and a duration time of a pressing corresponding to each pressed key; and judging the pressed key corresponding to the press operation according to the number of pressed points and the duration time of the pressing of each judged pressed key.

Various embodiments further provide a device for keypress judgment based on touch screen, comprising:

a detection module configured to detect a press operation;

an acquirement module, configured to, when the pressing operation is detected, acquire position information of current pressed point and extended information corresponding to the position information, until an end of the press operation is detected; and a judgment module, configured to judge a pressed key corresponding to the press operation according to the position information and the extended information of the pressed point in the press operation.

The device further includes an input module, configured to input according to the pressed key corresponding to the press operation.

The extended information includes at least one of:

a judgment area of a pressed key corresponding to the position information; and time information of the pressed point when pressing the pressed point to generate the position information.

When the extended information is the judgment area of the pressed key, the acquirement module is configured to: acquire the position information of the pressed point in the press operation and dynamically acquire the judgment area, the judgment area corresponds to a corresponding pressed key judged by the judgment module according to the position information; and the judgment module is configured to: judge a pressed key corresponding to a first pressed point according to a display area which position information of the first pressed point in the press operation acquired by the acquirement module belongs to; and judge according to position information of a second pressed point acquired by the acquirement module and the judgment area which is dynamically acquired according to the pressed key corresponding to the first pressed point, if the position information of the second pressed point is in the judgment area, judge that a pressed key corresponding to the second pressed point is the same as the pressed key corresponding to the first pressed point; otherwise, re-judge a pressed key corresponding to the second pressed point according to a display area which the position information of the second pressed point belongs to; cycle in this way, until all pressed points in the press operation have been judged; judge a corresponding pressed key determined according to a position information of the last pressed point as the pressed key corresponding to the press operation.

The acquirement module is further configured to amplify the display area of the pressed key to obtain the judgment area of the pressed key.

When the extended information is time information of the pressed point, the acquirement module is configured to for each corresponding pressed key, acquire a number of pressed points corresponding to the pressed key according to corresponding position information, and acquire a duration time of a pressing corresponding to the pressed key according to a press time of the corresponding last pressed point and a press time of the corresponding first pressed point in time sequence; and the judgment module is configured to: respectively judge a pressed key and pressing time corresponding to each pressed point according to position information and corresponding time information of each of a plurality of pressed points generated in the operation; judge the pressed key corresponding to the pressed operation according to preset rules according to the number of pressed points and the duration time for each pressed key acquired by the acquirement module.

When the acquired multiple pressed points correspond to a same pressed key, the judgment module is configured to judge that the corresponding same pressed key is the pressed key corresponding to the press operation.

When the acquired multiple pressed points correspond to different pressed keys, the judgment module is configured to:

when a number of pressed points corresponding to the last pressed key reaches a point threshold and/or a duration time corresponding to the last pressed key reaches a time threshold, determine that the pressed key corresponding to the press operation is the last pressed key; and otherwise, judge according to a number of pressed points corresponding to the second last pressed key and duration time of the pressed points; which is: when the number of pressed points corresponding to the second last pressed key does not reach a point threshold and the duration time corresponding to the second last pressed key does not reach a time threshold, determine that the pressed key corresponding to the press operation is the corresponding last pressed key, otherwise, determine that the pressed key corresponding to the press operation is the corresponding second last pressed key.

The device further includes a prompting module configured to according to the corresponding pressed key determined according to the pressed point, display a prompting message of the pressed key to the user.

When the extended information is judgment area and time information of the pressed key, the judgment module is configured to:

judge a pressed key corresponding to each pressed point according to the position information of the pressed points in the press operation and the judgment area of corresponding pressed key;

judge a pressing time corresponding to each pressed point according to the position information and corresponding time information of the pressed points in the press operation;

acquire a number of pressed points and a duration time of a pressing corresponding to each pressed key; and judge the pressed key corresponding to the press operation according to the number of pressed points and the duration time of the pressing of each judged pressed key.

The various embodiments, when receiving information of the pressed point, recording a duration time information and position information in the pressing information, and judging which key of a terminal is pressed according to the information, can reduce the misjudgment caused by the movement of the finger or touchpen and improve the accuracy of the key-press judgment of the touch screen.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
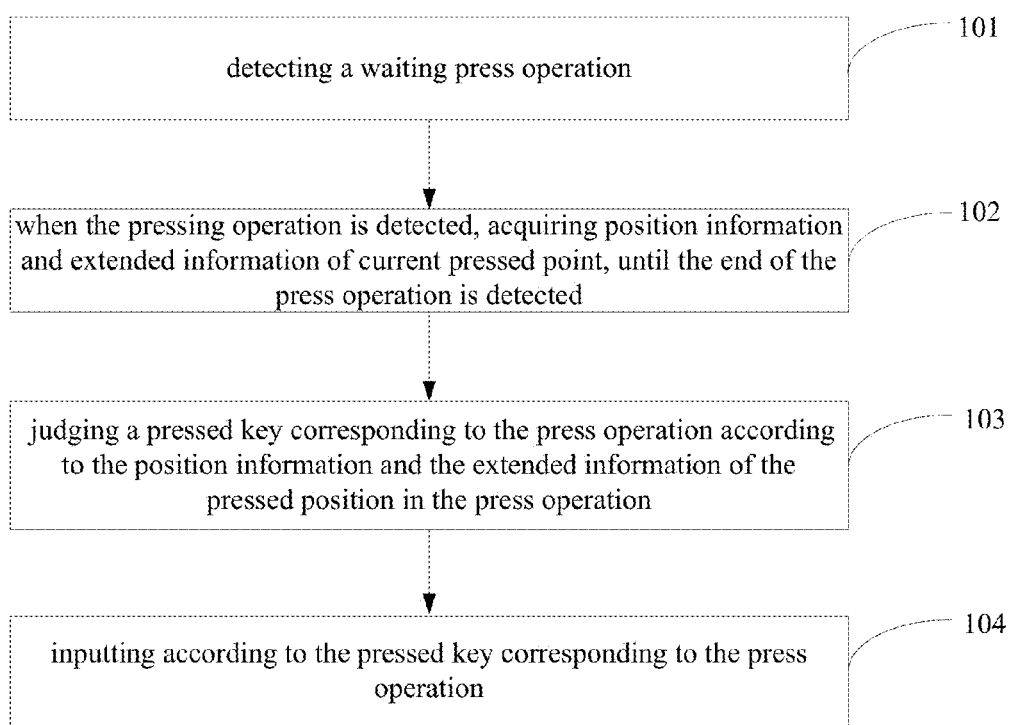
FIG. 1 is a flow chart of a method for key-press judgment based on touch screen of various embodiments.

FIG. 1 shows a method for key-press judgment based on touch screen provided in various embodiments, the method specifically includes the following:

At 101: detecting a waiting press operation;

At 102: when the pressing operation is detected, acquiring position information and extended information of current pressed point, until the end of the press operation is detected;

At 103: judging a pressed key corresponding to the press operation according to the position information and the extended information of the pressed point in the press operation;

At 104: inputting according to the pressed key corresponding to the press operation.

For each pressing point, the position information is used to identify the position of the current pressed point in the touch screen, preferably, taking one point in the touch screen as an origin to establish a coordinate system and using a coordinate corresponding to the current pressed point in the coordinate system to identify the position information of the pressed point. The position information can also be other information which is used to identify positions, and it is not limited here. The extended information is related information corresponding to the position information of the current pressed point, and is used to cooperate with the position information to judge a pressed key corresponding to the press operation, and can be a judgment area of the pressed key corresponding to the position information or time information etc. of the pressed point corresponding to the position information or a combination of these. Further, after the position information and the extended information of each of a plurality of pressed points are acquired, groups of position information and extended information can also be statistical processed to obtain other information which is needed to judge the press operation. For example, after a corresponding pressed key is acquired according to the position information of the pressed point, counting pressed points corresponding to the same pressed key to obtain a number of pressed points corresponding to the same pressed key, and obtaining a duration time of the press operation on the pressed key according to a first pressed point and the last pressed point in time sequence in the pressed points corresponding to the same key. The above extended information is only preferred implementation modes of embodiments, and all the information used to judge pressed keys corresponding to press operations belong to the scope of protection. For example, a relationship between continuously pressed keys, if after judgment, a pressed key corresponding to the first press operation is "s", then a pressed key corresponding to the second press operation can be "a" but cannot be "w" and so on.

The technical solutions of various embodiments are explained in details with reference to specific application scenarios. The extended information is "judgment area of a pressed key" and "time information", and when judging a pressed key corresponding to the pressed point according to the position information of the pressed point, the acquisition process and judgment process of information are parallel executed.

Figure 2:
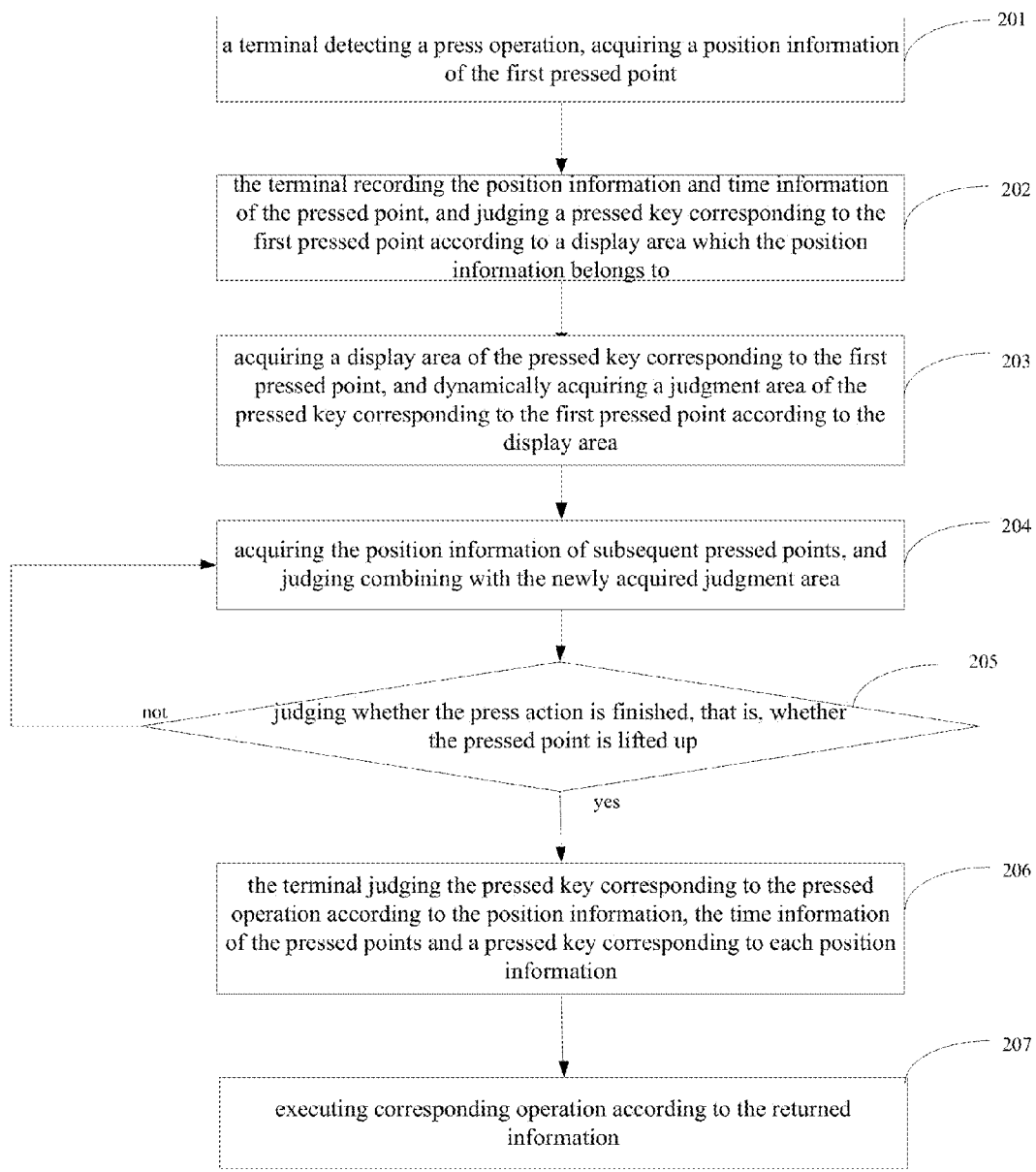
FIG. 2 is a flow chart of a method for key-press judgment based on a touch screen of various embodiments.
Figure 3:
FIG. 3 is a schematic diagram of a touch screen virtual keyboard of various embodiments.
Figure 4:
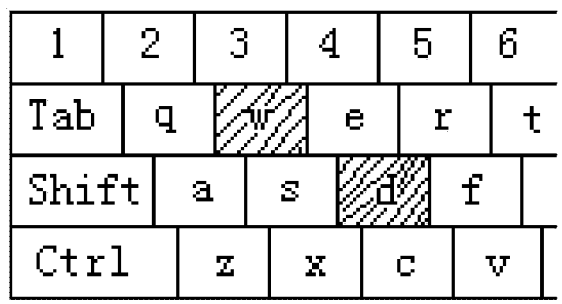
FIG. 4 shows judgment areas of pressed keys of a touch screen virtual keyboard of various embodiments.

FIG. 2 shows a method for key-press judgment based on a touch screen provided in various embodiments, the method specifically includes the following steps:

A touch screen virtual keyboard shown in FIG. 3 is taken as an example for illustration. The specific manifestation of the touch screen virtual keyboard do not define the limit of the scope of protection. The scope is not limited to the virtual keyboard in the touch screen, and can also be applied to other press operations such as clicking a folder and the like on the touch screen. At this time, a judgment area of the pressed key is the same as an area of the pressed key, as shown in FIG. 4, the shaded area is judgment areas of pressed keys.

At 201: a terminal detecting a press operation, acquiring a position information of the first pressed point.

Figure 5:
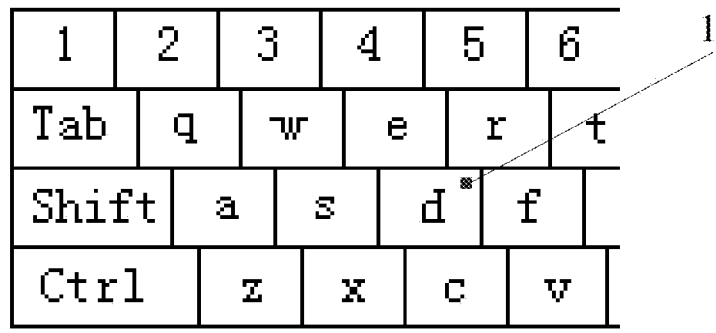
FIG. 5 shows a pressed point position of various embodiments.

For example, when a user presses an area of letter key d in a keyboard, the position of the pressed point 1 is shown in FIG. 5, which might be represented with coordinates, and it is assumed that the position of the pressed point 1 is (150, 100) at this time.

At 202: the terminal recording the position information and time information of the pressed point, and judging a pressed key corresponding to the first pressed point according to a display area which the position information belongs to.

For example, based on the assumption of 201, according to the position information (150, 100) of the pressed point 1, it is determined that a display area which the pressed point belongs to is a display area of the key d, and it is further judged that the pressed key corresponding to the first pressed point is the key d.

At 203: acquiring a display area of the pressed key corresponding to the first pressed point, and dynamically acquiring a judgment area of the pressed key corresponding to the first pressed point according to the display area.

Specifically, when it is determined that the pressed key corresponding to the first pressed point is d, the display area of the key d is acquired and is amplified, for example, dynamically amplified according to the proportion. Preferably, the display area is amplified to 1.1 times of the display area of a key to obtain the judgment area. At this time, the judgment areas of surrounding keys accordingly narrow. It should be noted, only the judgment area and the display area of the key remains unchanged. The judgment area is dynamically changed, when the position of the pressed point leaves the current judgment area, the judgment area fails, and then a corresponding judgment area is dynamically reacquired according to subsequent position of the pressed point.

Figure 6:
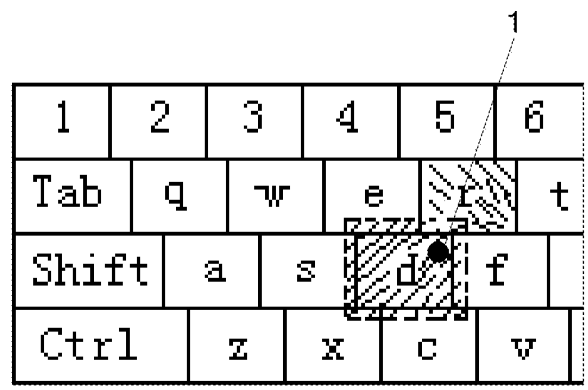
FIG. 6 shows a judgment area of a pressed key of various embodiments.

For example, when the pressed point 1 of the user is a key area where the key d is located, as shown in FIG. 6, at this time, the judgment area of the key d is a coverage area represented by a rectangle which is outlined by the dotted line. At this time, the judgment area of the key r also accordingly narrows, as shown by the right oblique shadow.

In various other adjustment methods, the display area of the pressed key is amplified according to a specified amplification range, and for example, 5 microns are added to each of the right and left of the width of the display area of the pressed key and so on. The specific adjustment ranges cannot be understood as the limit of the scope of protection.

Figure 7:
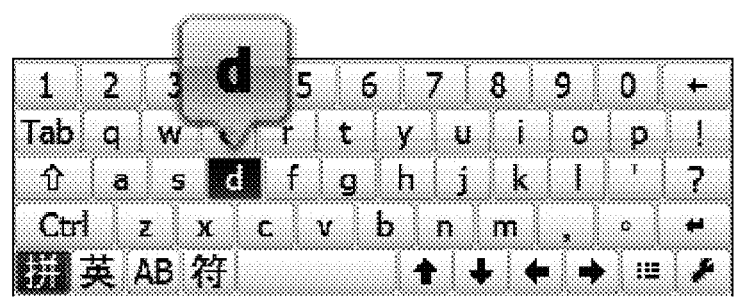
FIG. 7 shows a prompting message of a pressed key of various embodiments.

Preferably, the terminal judges a key where the pressed point belongs to according to the judgment area, displays a prompting message of the pressed key through the screen so that the user can feel the pressed key which is currently pressed. Specifically, via displaying some secondary prompt information can facilitate the user to know the pressed key, for example, using the modes such as key highlight, key anti-color, key amplification, bubble tips to display prompting information. As shown in FIG. 7, key anti-color or bubble tips are taken as an example for illustration.

At 204: acquiring the position information of subsequent pressed points, and judging combining with the newly acquired judgment area.

When the user presses, the system will continuously send information of the current pressed point, since the slight movement of a touchpen or a finger can cause changes of coordinates of the pressed point, thus one pressing point is usually not only a single point, but is composed of many points, The subsequent pressed point is taken as a second pressed point, and the newly acquired judgment area is illustrated by taking the judgment area obtained according to the first pressed point as an example. Specifically, if the position information of the second pressed point is in the judgment area obtained by the first pressed point, then it is judged that a pressed key corresponding to the second pressed point is the same as the pressed key corresponding to the first pressed point; otherwise, it is re-judged that a pressed key corresponds to the second pressed point according to a display area where the position information of the second pressed point belongs to.

At 205: judging whether the press action is finished, that is, whether the pressed point is lifted up.

If the pressed point is not lifted up, then go to 204;

If the pressed point is lifted up, then go to 206;

At 206: the terminal judging the pressed key corresponding to the pressed operation according to the position information, the time information of the pressed points and a pressed key corresponding to each position information.

The specific format of an information list of a series of press points received by the terminal is shown in table 1.

TABLE 1

| | information list | | |
|---|---|---|---|
| serial number | position information (coordinates) | time information | corresponding pressed key |
| xxx | xxx | xxx | xxx |

The terminal judging the pressed key corresponding to the pressed operation according to the position information, the time information of the pressed points and a pressed key corresponding to each position information in the information list of the press points specifically includes the following:

At 2061: for each acquired corresponding pressed key, acquiring a number of pressed points corresponding to the pressed key according to corresponding position information, and acquiring a duration time of a pressing corresponding to the pressed key according to a press time of the corresponding last pressed point and a press time of the corresponding first pressed point in time sequence.

At 2062: according to the acquired number of pressed points and duration time for each pressed key, judging the pressed key corresponding to the pressed operation according to preset rules.

It should be noted, before 206 (that is from 201 to 205), judging the corresponding pressed key according to the acquired position information of the pressed point might be not at the same time of acquiring the position information. Instead, after the press action is finished, judging pressed keys corresponding to the pressed points according to information of all the pressed points of the pressed operation and judging the pressed key corresponding to the pressed operation. At this time, 206 includes the following: (1) respectively judging a pressed key and pressing time corresponding to each pressed point according to position information and corresponding time information of each of a plurality of pressed points generated in the operation; (2) for each corresponding pressed key, acquiring a number of pressed points corresponding to the pressed key according to corresponding position information, and acquiring a duration time of a pressing corresponding to the pressed key according to a press time of the corresponding last pressed point and a press time of the corresponding first pressed point in time sequence; and (3) according to the acquired number of pressed points and duration time for each pressed key, judging the pressed key corresponding to the pressed operation according to preset rules.

Figure 8:
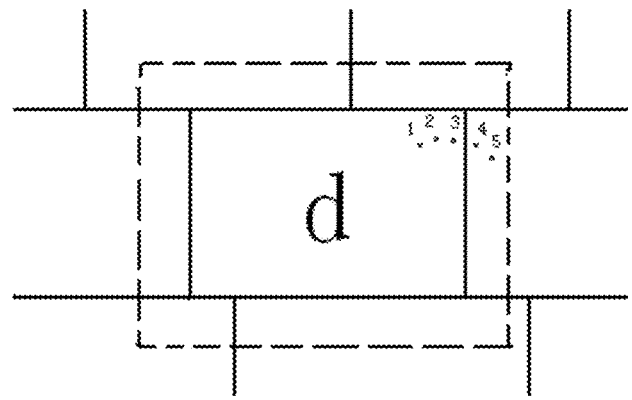
FIG. 8 shows a pressed point position of various embodiments.

The pressed key corresponding to pressed points includes the following two conditions:

(1) Multiple pressed points corresponding to the same pressed key. For example, as shown in FIG. 8, the positions of the pressed points 1, 2, 3, 4 and 5 are still in the judgment area of the pressed key d, their corresponding pressed key is the pressed key d.

Figure 9:
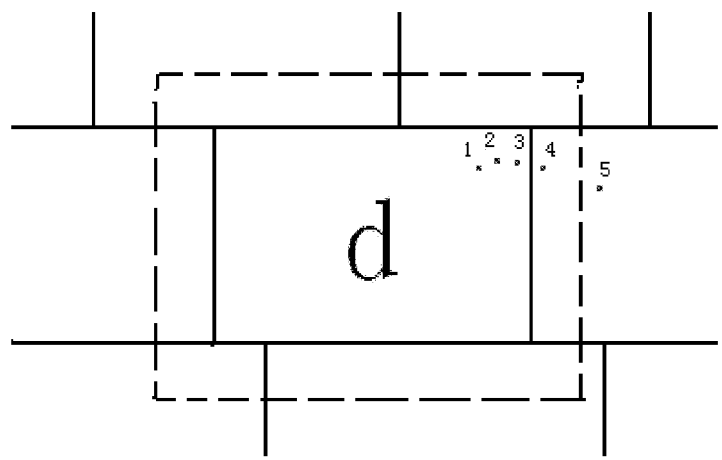
FIG. 9 shows a pressed point position of various embodiments.
Figure 10:
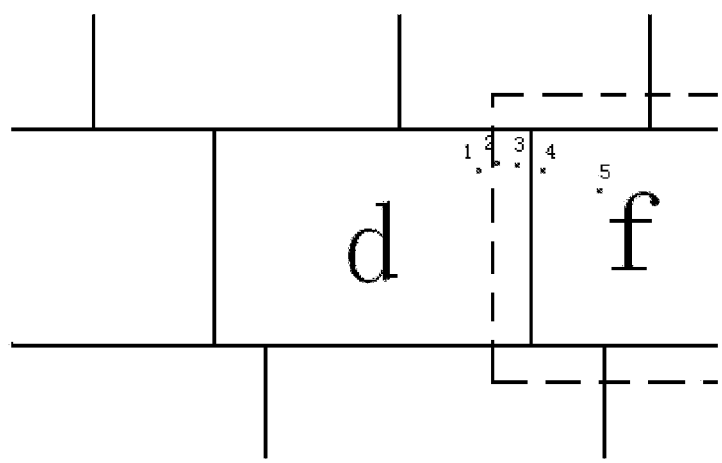
FIG. 10 shows a pressed point position of various embodiments.

(2) Multiple pressed points corresponding to different pressed keys. For example, as shown in FIG. 9, the positions of the pressed points 1, 2, 3 and 4 belong to the judgment area of the pressed key d, and their corresponding pressed key is the pressed key d; while the position of the pressed point 5 does not belong to the judgment area of the pressed key d, at this time, a judgment area for the pressed point 5 is determined according to the above method. As shown in FIG. 10, the position of the pressed point 5 belongs to the judgment area of the pressed key f, and the corresponding pressed key is f.

In the following, the pressed key corresponding to pressed points is judged according to the judgment criterion for the above two kinds of circumstances, respectively.

1. Multiple Pressed Points Corresponding to the Same Pressed Key

At this time, the corresponding same pressed key is the pressed key corresponding to the press operation.

Figure 11:
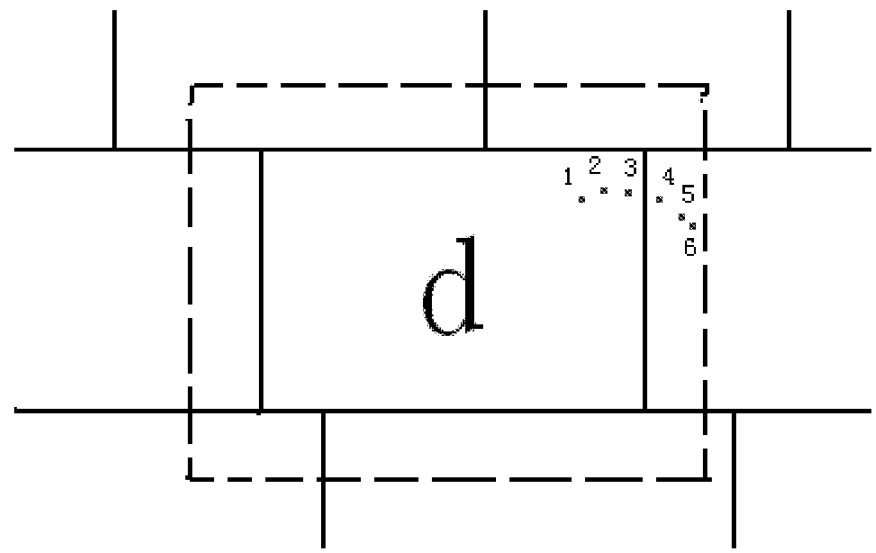
FIG. 11 shows a pressed point position of various embodiments.

As shown in FIG. 11, the pressed points shown in the figure are pressed points 1 to 6 in turn for left to right, for the pressed points 1 to 6 (when at the pressed point 6, the user stops pressing), since the pressed key corresponding to the pressed points 1 to 6 is the pressed key d, thus, the user's behavior is judged as pressing the pressed key d.

2. Multiple Pressed Points Corresponding to Different Pressed Keys

At this time, the judgment criterion is: when the number of pressed points corresponding to the last pressed key reaches a point threshold and/or the duration time corresponding to the last pressed key reaches a time threshold, then it is determined that the pressed key corresponding to the press operation is the last pressed key; otherwise, it is judged according to the number of pressed points corresponding to the second last pressed key and the duration time of the pressed points. It specifically is: when the number of pressed points corresponding to the second last pressed key does not reach a point threshold and the duration time corresponding to the second last pressed key does not reach a time threshold, then it is determined that the pressed key corresponding to the press operation is the corresponding last pressed key, otherwise, then it is determined that the pressed key corresponding to the press operation is the corresponding second last pressed key.

It is judged by taking the preferred judgment criterion shown in table 2 as an example.

TABLE 2

| | judgment criterion | |
|---|---|---|
| last pressed key | previous pressed key | result |
| duration time ≥20 or number of pressed points ≥3 | any conditions | the last pressed key |
| duration time <20 and number of pressed points <3 | duration time ≥20 or number of pressed points ≥3 | the previous pressed key |
| | duration time <20 and number of pressed points <3 | duration time ≥20 or number of pressed points ≥3 |

It can be seen from table 2:

(1) if the residence time of the last pressed key is larger than or equal to 20 microseconds (the time can be adjusted according to needs of specific platforms) or the number of pressed points is larger than or equal to 3, then it is judged that the last pressed key of the terminal is pressed.

(2) if the residence time of the last pressed key is smaller than 20 microseconds (the time can be adjusted according to needs of specific platforms) and the number of coordinate points is smaller than 3, then:

A. if the residence time of the previous pressed key is larger than or equal to 20 microseconds (the time can be adjusted according to needs of specific platforms) or the number of coordinate points is larger than or equal to 3, then it is judged that the previous pressed key of the terminal is pressed.

B. if the residence time of the previous pressed key is smaller than 20 microseconds (the time can be adjusted according to needs of specific platforms) and the number of coordinate points is smaller than 3, then it is judged that the last pressed key of the terminal is pressed.

Figure 12:
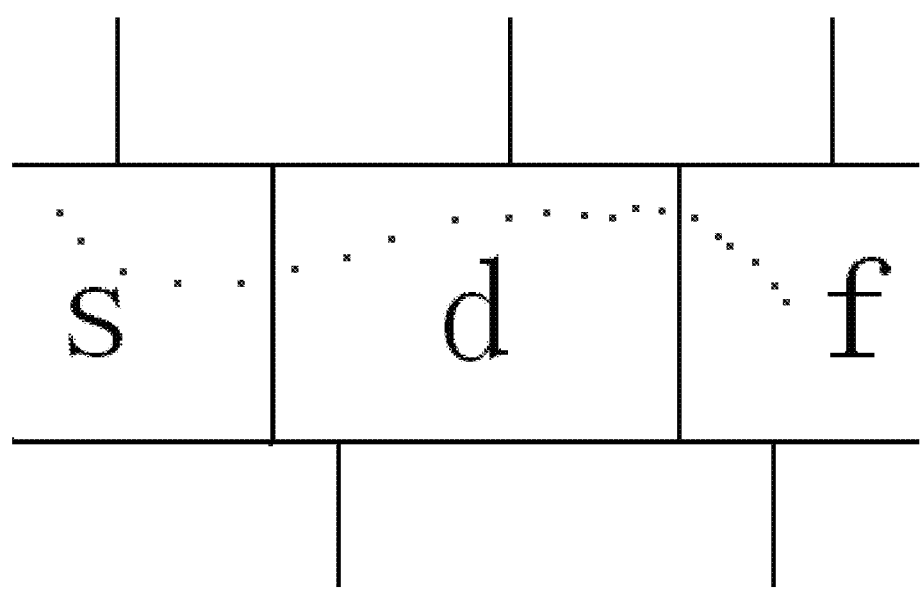
FIG. 12 shows a pressed point position of various embodiments.

For example, as shown in FIG. 12, the user moves pressed points during the pressing process, the track of the pressed points steps across the display areas of the three pressed keys s, d and f. At this time, as shown in FIG. 13, when the position pressed by the user is in the pressed points 1-6, the system prompts the pressed key is key s; when in the pressed points 7-h, the system prompts the pressed key is d; when in the pressed points i-k, the system prompts the pressed key is f, then when the user lifts up the pressed points, it is only needed to judge the time relationship of the last two pressed keys, i.e., the pressed points 7-h and i-k.

Figure 13:
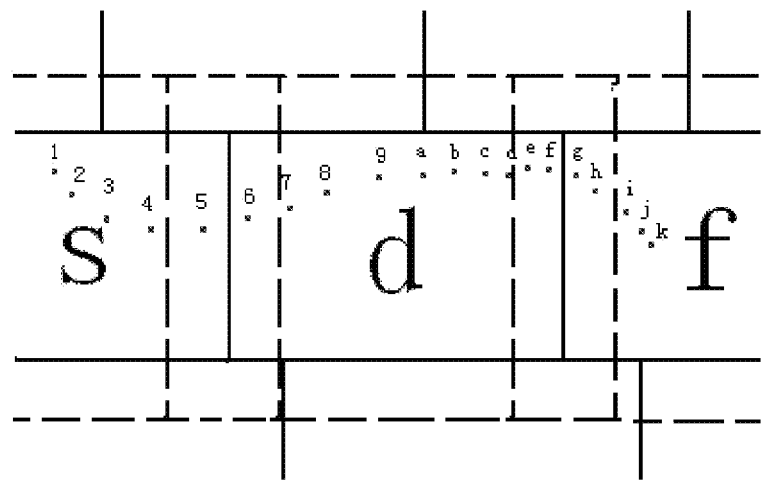
FIG. 13 shows a pressed point position of various embodiments.

An information list of the pressed points of FIG. 13 is shown in table 3.

TABLE 3 information list of pressed points

| serial number | coordinates | time difference with the previous point | belong to key |
|---|---|---|---|
| 1 | 50, 100 | 0 | s |
| 2 | 55, 104 | 12 | s |
| ... | ... | ... | |
| 7 | 90, 108 | 38 | d |
| 8 | 98, 102 | 46 | d |
| ... | ... | ... | |
| G | 163, 103 | 124 | d |
| H | 165, 107 | 127 | d |
| I | 172, 110 | 132 | f |
| J | 176, 112 | 138 | f |
| K | 179, 114 | 142 | f |

According to the information in table 3, information can be integrated in accordance with situations in different pressed keys such as duration time and number of pressed points, to obtain integrated information shown in table 4.

TABLE 4 integrated information of pressed points

| pressed key | number of coordinates | residence time | explanation |
|---|---|---|---|
| s | 6 | 38 | coordinate 7-coordinate 1 ignored and do not participate in the judgment |
| d | 11 | 94 | coordinate i-coordinate 7 |
| f | 3 | 10 | coordinate k-coordinate i |

It can be seen from the above judgment criterion in combination with table 4, the judgment result is that the pressed key of the terminal is D.

It should be noted, the judgment criterion varies from different models and different systems, and changes to specific judgment forms cannot be understood as the limit of the scope of protection, for example, for terminals having larger screens, pressed points are judged by taking 5 as a demarcation point.

At 207: executing corresponding operation according to the returned information.

Specifically, if effective key information is returned, then the corresponding input action of the pressed key is executed. If effective key information is not returned, then it will not execute corresponding input action.

Taking FIG. 3 as an example, when it is determined that the pressed key corresponding to the pressed operation is a character or punctuation key, then corresponding character or punctuation is input. When it is determined as other keys except character or punctuation keys, for example when the pressed key is Space key, space key is entered; when it is determined as Backspace key, the previous character is deleted; when the pressed key is Enter key, a line feed operation is executed.

It should be noted, various embodiments are illustrated with the example of the extended information being "judgment area of pressed key" and "time information". The extended information of various embodiments can also be "judgment area of pressed key" or "time information", if the extended information is judgment area of pressed key, after the above step 205, it can be directly judged that a corresponding pressed key determined according to the position information of the last pressed point is the pressed key corresponding to the press operation. If the extended information is time information of the pressed point, a judgment area and a display area of the above pressed key is the same, i.e., judging the pressed key which the pressed point belongs to directly according to position information and time information of the pressed point. Since when the extended information is judgment area or time information of the pressed key the specific judgment steps are similar to various embodiments, it will not be repeated here.

Figure 14:
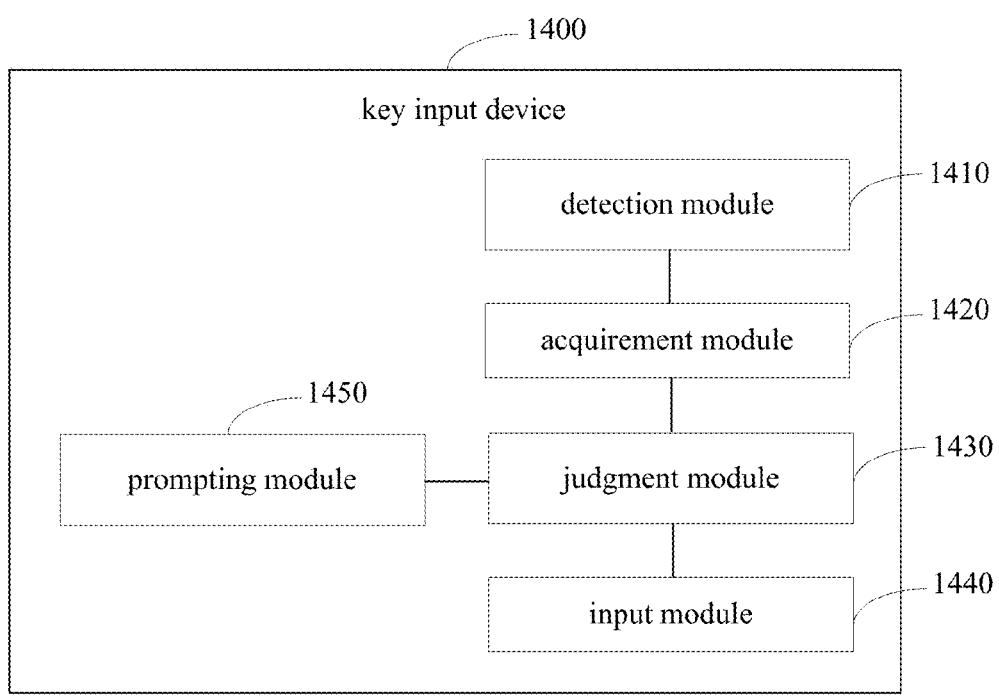
FIG. 14 is a schematic diagram of a device for key-press judgment based on touch screen of various embodiments.

Various embodiments provide a device for key-press judgment based on touch screen, as shown in FIG. 14, the device 1400 includes:

a detection module 1410, configured to detect a press operation;

an acquirement module 1420, configured to, when the pressing operation is detected, acquire position information of current pressed point and extended information corresponding to the position information, until the end of the press operation is detected;

a judgment module 1430, configured to judge a pressed key corresponding to the press operation according to the position information and the extended information of the pressed point in the press operation; and an input module 1440, configured to input according to the pressed key corresponding to the press operation.

The extended information includes one or more of the following:

judgment area of the pressed key corresponding to the position information;

time information of the pressed point when pressing the pressed point to generate the position information.

When the extended information is judgment area of the pressed key, the acquirement module 1420 is configured to: acquire the position information of the pressed point in the press operation and dynamically acquire the judgment area, the judgment area corresponds to a corresponding pressed key judged by the judgment module 1430 according to the position information;

The judgment module 1430 is configured to: judge a pressed key corresponding to the first pressed point according to a display area which the position information of the first pressed point in the press operation acquired by the acquirement module 1420 belongs to; and judge according to the position information of the second pressed point acquired by the acquirement module 1420 and the judgment area which is dynamically acquired according to the pressed key corresponding to the first pressed point, if the position information of the second pressed point is in the judgment area, then it is judged that a pressed key corresponding to the second pressed point is the same as the pressed key corresponding to the first pressed point. Otherwise, it is re-judged that a pressed key corresponds to the second pressed point according to a display area which the position information of the second pressed point belongs to; cycling in this way, until the judgment of all the pressed points in the press operation is completed; judge a corresponding pressed key determined according to the position information of the last pressed point as the pressed key corresponding to the press operation.

The acquirement module 1420 is also configured to: amplify the display area of the pressed key to obtain the judgment area of the pressed key.

The extended information is time information of the pressed point.

The acquirement module 1420 is specifically configured to: for each corresponding pressed key, acquire a number of pressed points corresponding to the pressed key according to corresponding position information, and acquire a duration time of a pressing corresponding to the pressed key according to a press time of the corresponding last pressed point and a press time of the corresponding first pressed point in time sequence.

The judgment module 1430 is specifically configured to: respectively judge a pressed key and pressing time corresponding to each pressed point according to position information and corresponding time information of each of a plurality of pressed points generated in the operation; and judge the pressed key corresponding to the pressed operation according to preset rules according to the number of pressed points and the duration time for each pressed key acquired by the acquirement module 1420.

When the acquired multiple pressed points correspond to the same pressed key, the judgment module 1430 is specifically configured to judge that the corresponding same pressed key is the pressed key corresponding to the press operation.

When the acquired multiple pressed points correspond to different pressed keys, the judgment module 1430 is specifically configured to:

when the number of pressed points corresponding to the last pressed key reaches a point threshold and/or the duration time corresponding to the last pressed key reaches a time threshold, determine that the pressed key corresponding to the press operation is the last pressed key;

otherwise, judge according to the number of pressed points corresponding to the second last pressed key and the duration time of the pressed points; it specifically is: when the number of pressed points corresponding to the second last pressed key does not reach a point threshold and the duration time corresponding to the second last pressed key does not reach a time threshold, then it is determined that the pressed key corresponding to the press operation is the corresponding last pressed key, otherwise, it is determined that the pressed key corresponding to the press operation is the corresponding second last pressed key.

The device further includes:

a prompting module 1450, configured to, according to the corresponding pressed key determined according to the pressed point, display a prompting message of the pressed key to the user.

When the extended information is judgment area and time information of the pressed key, the judgment module 1430 is specifically configured to:

judge a pressed key corresponding to each pressed point according to the position information of the pressed points in the press operation and the judgment area of corresponding pressed key;

judge a pressed key corresponding to the press operation, according to the pressed key corresponding to each judged pressed point and the time information corresponding to each pressed key.

Various embodiments, via receiving information of the pressed point, recording a duration time information and position information in the pressing information, and judging which key of a terminal is pressed according to the information, can reduce the misjudgment caused by the movement of the finger or touchpen and improve the accuracy of the keypress judgment of the touch screen.

Further, in various embodiments, after judging the pressed key corresponding to the pressed point, the display area of the pressed key is acquired and the display area is amplified according to the proportion to obtain the judgment area. The judgment area is larger than corresponding pressed key, the method of judging a pressed key which the pressed point belongs to according to the judgment area can prevent the misjudgment caused by the slight movement of the finger or touchpen, particularly the misjudgment caused by movement of the finger or touchpen in the lift operation.

Based on the above-description of the examples, one skilled in the art would clearly recognize that the examples may be implemented by machine-readable instructions plus a necessary common hardware platform. They may also be implemented by hardware. Based on such understanding, the technical solutions of the examples substantially or in individual parts may be presented in a form of machine-readable instructions which is stored in a non-transitory computer readable storage medium including several instructions to make a computing device (may be a personal computer, a server, a network device, etc.,) execute the method of the examples.

The foregoing are only preferred embodiments, and it should be noted, for one skilled in the art, some improvements and refinements can be made without departing from the principles of protection, and these improvements and refinements should be covered within the scope of protection.

One skilled in the art may understand that the modules in the apparatus of the examples disclosed herein may be distributed in the apparatus of the example according to the descriptions of the examples, and may also be varied to be located in one or more apparatuses different from those of the examples. The modules of the above examples may be integrated into one module or may be further divided into multiple sub-modules.

The serial numbers of the various embodiments are only for description, and do not represent the quality of the embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for key-press judgment based on a touch screen, comprising:
- detecting a press operation on a virtual desktop keyboard displayed on the touch screen;
- when the pressing operation is detected, acquiring position information of a current pressed point and extended information corresponding to the position information, until an end of the press operation is detected;
- judging a pressed key corresponding to the press operation according to the position information and the extended information of the pressed point in the press operation;
- wherein the method further comprises when it is judged that the press operation corresponds to an effective pressed key, inputting according to the pressed key corresponding to the press operation;
- wherein when the extended information is time information of the pressed point, the judging a pressed key corresponding to the press operation according to the position information and the extended information of the pressed point in the press operation comprises:
- respectively judging a pressed key and pressing time corresponding to each pressed point according to position information and corresponding time information of each of a plurality of pressed points generated in the operation;
- for each corresponding pressed key, acquiring a number of pressed points corresponding to the pressed key according to corresponding position information, and acquiring a duration time of a pressing corresponding to the pressed key according to a press time of a corresponding last pressed point and a press time of a corresponding first pressed point in time sequence;
- judging the pressed key corresponding to the pressed operation in accordance with preset rules according to the acquired number of pressed points and duration time for each pressed key.

2. The method according to claim 1, wherein when the acquired multiple pressed points correspond to same pressed key, the judging the pressed key corresponding to the pressed operation in accordance with preset rules according to the acquired number of pressed points and duration time for each pressed key comprises: the corresponding same pressed key is the pressed key corresponding to the press operation.

3. The method according to claim 1, wherein when the acquired multiple pressed points correspond to different pressed keys, the judging the pressed key corresponding to the pressed operation in accordance with preset rules according to the acquired number of pressed points and duration time for each pressed key comprises:
- when a number of pressed points corresponding to the last pressed key reaches a point threshold and/or a duration time corresponding to the last pressed key reaches a time threshold, determining that the pressed key corresponding to the press operation is the last pressed key;
- otherwise, judging according to a number of pressed points corresponding to the second last pressed key and a duration time of the pressed points; which comprises: when the number of pressed points corresponding to the second last pressed key does not reach a point threshold and the duration time corresponding to the second last pressed key does not reach a time threshold, then it is determined that the pressed key corresponding to the press operation is the corresponding last pressed key, otherwise, it is determined that the pressed key corresponding to the press operation is the corresponding second last pressed key.

4. The method according to claim 1, further comprising:
- according to the corresponding pressed key determined according to the pressed point, displaying a prompting message of the pressed key to the user.

5. The method according to claim 1, wherein when the extended information is judgment area and time information of the pressed key, the judging a pressed key corresponding to the press operation according to the position information and the extended information of the pressed point in the press operation includes:
- judging a pressed key corresponding to each pressed point according to the position information of the pressed points in the press operation and the judgment area of corresponding pressed key;
- judging a pressing time corresponding to each pressed point according to the position information and corresponding time information of the pressed points in the press operation;
- acquiring a number of pressed points and a duration time of a pressing corresponding to each pressed key;
- judging the pressed key corresponding to the press operation according to the number of pressed points and the duration time of the pressing of each judged pressed key.

6. A device comprising:
- a touch screen;
- a detection module configured to detect a press operation on a virtual keyboard displayed on the touch screen;
- an acquirement module configured so that, when the pressing operation is detected, acquire position information of a current pressed point and extended information corresponding to the position information, until an end of the press operation is detected;
- a judgment module configured to determine a pressed key corresponding to the press operation according to the position information and the extended information of the pressed point in the press operation;
- an input module configured to input according to the pressed key corresponding to the press operation;
- wherein when the extended information is time information of the pressed point,
- the acquirement module is configured to: for each corresponding pressed key, acquire a number of pressed points corresponding to the pressed key according to corresponding position information, and acquire a duration time of a pressing corresponding to the pressed key according to a press time of the corresponding last pressed point and a press time of the corresponding first pressed point in time sequence; and
- the judgment module is configured to: respectively judge a pressed key and pressing time corresponding to each pressed point according to position information and corresponding time information of each of a plurality of pressed points generated in the operation; judge the pressed key corresponding to the pressed operation according to preset rules according to the number of pressed points and the duration time for each pressed key acquired by the acquirement module.

7. The device according to claim 6, wherein when the acquired multiple pressed points correspond to a same pressed key, the judgment module is configured to judge that the corresponding same pressed key is the pressed key corresponding to the press operation.

8. The device according to claim 6, wherein when the acquired multiple pressed points correspond to different pressed keys, the judgment module is configured to:

when a number of pressed points corresponding to the last pressed key reaches a point threshold and/or a duration time corresponding to the last pressed key reaches a time threshold, determine that the pressed key corresponding to the press operation is the last pressed key;

otherwise, judge according to a number of pressed points corresponding to the second last pressed key and duration time of the pressed points; which is: when the number of pressed points corresponding to the second last pressed key does not reach a point threshold and the duration time corresponding to the second last pressed key does not reach a time threshold, determine that the pressed key corresponding to the press operation is the corresponding last pressed key, otherwise, determine that the pressed key corresponding to the press operation is the corresponding second last pressed key.

9. The device according to claim 6, further comprising:

a prompting module configured to, according to the corresponding pressed key determined according to the pressed point, display a prompting message of the pressed key to the user.

10. The device according to claim 6, wherein when the extended information is judgment area and time information of the pressed key, the judgment module is configured to:

judge a pressed key corresponding to each pressed point according to the position information of the pressed points in the press operation and the judgment area of corresponding pressed key;

judge a pressing time corresponding to each pressed point according to the position information and corresponding time information of the pressed points in the press operation;

acquire a number of pressed points and a duration time of a pressing corresponding to each pressed key;

judge the pressed key corresponding to the press operation according to the number of pressed points and the duration time of the pressing of each judged pressed key.

* * * * *